US011635830B2

United States Patent
Ghioni et al.

(10) Patent No.: US 11,635,830 B2
(45) Date of Patent: Apr. 25, 2023

(54) HAPTIC TRACKPAD WITH ANISOTROPIC COMPLIANT SPACER

(71) Applicant: Microsoft Technology Licensing, LLC, Redmond, WA (US)

(72) Inventors: Lincoln Matthew Ghioni, Redmond, WA (US); Federico Zannier, Seattle, WA (US); Tianyu Zhao, Kirkland, WA (US); Thomas Joseph Longo, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/306,312

(22) Filed: May 3, 2021

(65) Prior Publication Data
US 2022/0350429 A1 Nov. 3, 2022

(51) Int. Cl.
*G06F 3/0354* (2013.01)
*G06F 3/01* (2006.01)
*H01H 13/7073* (2006.01)
*H01H 3/00* (2006.01)

(52) U.S. Cl.
CPC .......... *G06F 3/03547* (2013.01); *G06F 3/016* (2013.01); *H01H 13/7073* (2013.01); *H01H 2003/008* (2013.01); *H01H 2215/052* (2013.01)

(58) Field of Classification Search
CPC . G06F 3/03547; G06F 3/016; H01H 13/7073; H01H 2003/008; H01H 2215/052
See application file for complete search history.

(56) References Cited

U.S. PATENT DOCUMENTS

| | | | |
|---|---|---|---|
| 5,917,906 | A | 6/1999 | Thornton |
| 7,391,861 | B2 | 6/2008 | Levy |
| 7,684,953 | B2 | 3/2010 | Feist et al. |
| 8,059,104 | B2 | 11/2011 | Shahoian et al. |
| 2017/0153703 | A1 | 6/2017 | Yun et al. |
| 2017/0285848 | A1* | 10/2017 | Rosenberg .......... G06F 3/03547 |
| 2020/0174657 | A1 | 6/2020 | Rosenberg et al. |

FOREIGN PATENT DOCUMENTS

| | | |
|---|---|---|
| AU | 2013205165 B2 | 9/2015 |
| KR | 101312550 B1 | 10/2013 |

OTHER PUBLICATIONS

Sumra, Husain, "Apple's 'Force Touch' Trackpad Fools Users Into Feeling Clicks Without Actually Moving", Retrieved from: https://www.macrumors.com/2015/03/12/force-touch-trackpad-click/, Mar. 12, 2015, 17 Pages.
"International Search Report and Written Opinion Issued in PCT Application No. PCT/US22/024128", dated Jul. 11, 2022, 10 Pages.

* cited by examiner

*Primary Examiner* — Afroza Chowdhury
(74) *Attorney, Agent, or Firm* — Holzer Patel Drennan

(57) ABSTRACT

Supplementing the movement stroke of a trackpad with a haptic response is one way to restore some or all of a reduced trackpad feel and overall performance caused by a reduction in the movement stroke. However, incorporating haptic responses in a clickable trackpad may interfere with accurate force measurement using physical movement of the trackpad as a proxy. The following describes haptic trackpads with anisotropic compliant spacers. The disclosed haptic trackpads permit selective haptic responses to a user, while also permitting accurate force measurement using displacement of a sensing surface caused by the user's finger(s) as a proxy.

20 Claims, 7 Drawing Sheets

HAPTIC TRACKPAD WITH ANISOTROPIC COMPLIANT SPACER

BACKGROUND

A trackpad (also referred to as a touchpad) is a pointing device featuring a tactile sensor that can detect the position and motion and of a user's finger(s) on a sensing surface and convert the detected position and motion into a digital output. The digital output of the trackpad is input to an operating system, which in turn displays a position and motion of a cursor corresponding to the user's finger(s) on a display screen of a computing device.

Some trackpads are "clickable" (also referred to as clickpads), which refers to an additional ability to detect a magnitude of force on or displacement of the sensing surface caused by the user's finger(s) and include force/displacement magnitude in the digital output. The operating system may utilize the force/displacement magnitude applied by the user's finger(s) to determine if the user intends to "click" the trackpad in the detected position and with the detected motion of the user's finger(s).

SUMMARY

Implementations described and claimed herein provide a trackpad comprising a frame, a printed circuit board including a touch sensor, and an anisotropic compliant spacer oriented between the frame and the PCB. The anisotropic compliant spacer includes a rigid feature that occupies substantially all of a thickness of the anisotropic compliant spacer, the rigid feature to limit compressive displacement of the anisotropic compliant spacer. The anisotropic compliant spacer also includes a compliant filler that occupies a remainder of the anisotropic compliant spacer, the compliant filler to permit shear displacement of the anisotropic compliant spacer.

Implementations described and claimed herein further provide a method for manufacturing a trackpad with an anisotropic compliant spacer. The method comprises fixedly attaching a first distal end of a spring to a frame of the trackpad, applying a compliant filler on a second distal end of the spring, placing a rigid feature within the compliant filler, and compressing a printed circuit board including a touch sensor onto the compliant filler. The rigid feature defines a thickness of the compliant filler, the rigid feature limits compressive displacement of the anisotropic compliant spacer, and the compliant filler permits shear displacement of the anisotropic compliant spacer.

Implementations described and claimed herein still further provide a haptic button comprising a frame, a touch interface, an anisotropic compliant spacer oriented between the frame and the touch interface, and a spring connecting the anisotropic compliant spacer to the frame, the spring to permit compressive displacement of the touch interface with reference to the frame. The anisotropic compliant spacer includes a spaced rigid feature that occupies substantially all of a thickness of the anisotropic compliant spacer, the rigid feature to limit compressive displacement of the anisotropic compliant spacer. The anisotropic compliant spacer also includes a compliant filler that occupies a remainder of the anisotropic compliant spacer, the compliant filler to permit shear displacement of the anisotropic compliant spacer.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

Some clickable trackpads physically move in response to the user's application of force on the sensing surface and use the physical movement of the trackpad as a proxy for the force applied by the user on the sensing surface. In this manner, such trackpads can not only detect a force intended to be a "click," but a range of force magnitudes that may be used by the operating system to provide additional outputs to the user. Further, the physical movement of the trackpad caused by the user's application of force may coincide with a detected "click" by the operating system, to enhance the user's experience. As computing devices shrink in overall thickness, trackpads associated with the computing devices are also expected to shrink in thickness. However, user expectations demand that trackpad feel and overall performance remain substantially the same or improved.

Reducing the movement stroke of the trackpads is one way to reduce trackpad thickness at the cost of reduced trackpad feel and overall performance as the movement stroke may become so small as it is undetectable by the user. Supplementing the movement stroke of a trackpad with a haptic response is one way to restore some or all of a reduced trackpad feel and overall performance caused by the reduction in the movement stroke. However, incorporating haptic responses in a clickable trackpad may interfere with accurate force measurement using physical movement of the trackpad as a proxy.

The following describes in detail haptic trackpads with anisotropic compliant spacers. The disclosed haptic trackpads permit selective haptic responses to a user, while also permitting accurate force measurement using displacement of a sensing surface caused by the user's finger(s) as a proxy.

Figure 1:
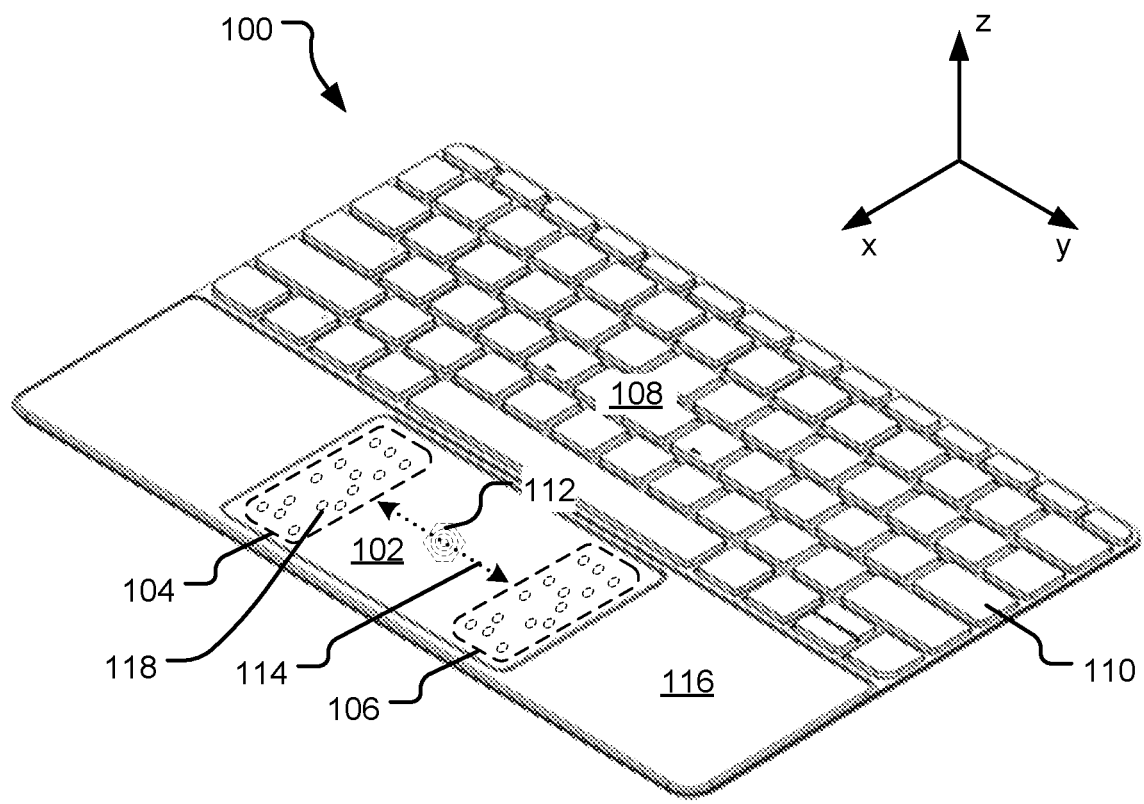
FIG. 1 illustrates a perspective view of an example keyboard including a haptic trackpad with anisotropic compliant spacers according to the presently disclosed technology.

FIG. 1 illustrates a perspective view of an example keyboard 100 including a haptic trackpad 102 with anisotropic compliant spacers 104, 106. Generally, the keyboard 100 includes a keypad 108 and the haptic trackpad 102 mounted within a frame 116. The keypad 108 contains an array of keys (e.g., key 110) arranged in a predetermined pattern (e.g., QWERTY). Each key within the keypad 108 may be communicatively connected to an associated computing device (also not shown). The haptic trackpad 102 (also referred to herein as a user-depressible touchpad or mousepad) converts physical user inputs into corresponding electrical signals that may be interpreted by the computing device, as well as providing haptic feedback to the user.

The keyboard 100 may also secure additional electronic components or other user user-depressible interface components (e.g., push buttons, dials, and/or knobs, not shown). In various implementations, some or all of the haptic trackpad 102, individual keys of the keypad 108, and the push buttons, dials, and/or knobs incorporated within the keyboard 100 may incorporate anisotropic compliant spacers with features as described in detail below with reference to the anisotropic compliant spacers 104, 106.

The haptic trackpad 102 (or other user-depressible interface that incorporates anisotropic compliant spacers) may have a variety of mechanical arrangements that achieve a specified physical depression magnitude (or travel), with a variety of force-deflection profiles. For the purposes of using the physical depression magnitude as a proxy for force measurement, however, moving the physical depression from the compliant spacer to another structure (e.g., cantilever spring 224 of FIG. 2) aids in accurately measuring the physical depression magnitude, and thus the applied force on the haptic trackpad 102.

While the haptic trackpad 102 is capable of physical depression in order to detect the force magnitude applied on the haptic trackpad 102, the physical depression may be insufficient to provide a user an adequate trackpad feel and feedback. For example, the depression may be too small for the user to gauge application of adequate pressure to constitute a "click." To enhance the user's perception of adequate pressure to constitute a "click," the haptic trackpad 102 includes haptic element 112 that is actuated by and works in conjunction with the physical travel of the haptic trackpad 102 to give physical feedback to the user that adequate force to constitute a "click" has been detected by the haptic trackpad 102. This may offer the user a feel and overall performance comparable to some traditional clickable buttons snap-over collapsing in physical travel. In other implementations, this offers the user a feel and overall performance superior to some traditional clickable buttons.

The haptic element 112 generates haptic feedback in the form of a user-perceptible "click" by generating vibration or other repeated forces or motions (collectively, haptic responses) and transmitting the generated vibration, forces, or motions to the user via the haptic trackpad 102 concurrently with or immediately before or after the physical travel of the haptic trackpad 102 caused by the user's application of force on the haptic trackpad 102. The haptic element 112 may utilize a variety of technologies to generate the vibration or other repeating forces or motions (e.g., weighted and unbalanced (linear or rotational) motors or electromagnetic actuators, piezoelectric devices, vibra-motors, electrostatic feedback devices, and ultrasonic devices).

In various implementations, the haptic feedback is defined as any repeating oscillating motion that exceeds 5 g of acceleration and an approximately 100-micron displacement, while overall staying in position. The haptic feedback may also include a noise generated by the haptic element 112 as it oscillates (e.g., via resonance or collision of adjacent parts within the haptic trackpad 102). As an example, linear oscillating vibration of the haptic trackpad 102 driven by the haptic element 112 is illustrated by dotted arrow 114, which is oriented along the y-axis of the haptic trackpad 102. In other implementations, the linear oscillating vibration is oriented along the x-axis or a combination of the x-axis and the y-axis of the haptic trackpad 102. A rotational oscillating vibration may be oriented within an x-y plane of the haptic trackpad 102.

In various implementations, depending upon the computing device type and construction, the frame 116 may be a device bucket or mid-frame, which serves as a structural framework for the keyboard 100. The anisotropic compliant spacers 104, 106 connect portions of the haptic trackpad 102 to the frame 116 via the dedicated spring(s). In order for the haptic element 112 to vibrate the haptic trackpad 102 within the x-y plane, the haptic trackpad 102 is designed for compliance in the x-y plane with reference to the frame 116 using the anisotropic compliant spacers 104, 106. This allows the haptic trackpad 102 to be capable of movement caused by the haptic element 112 in the x-y plane with reference to the frame 116.

The haptic trackpad 102 is further designed with an absence of compliance (or very low compliance) in the z-direction with reference to the frame 116 within the anisotropic compliant spacers 104, 106. This allows any z-direction displacement of sensing surface of the haptic trackpad 102 to be tracked by dedicated spring(s) (e.g., cantilever spring 224 of FIG. 2) within the haptic trackpad 102 that utilizes z-direction displacement as a proxy for force measurement using displacement of the sensing surface caused by the user's finger(s) within the spring.

The anisotropic compliant spacers 104, 106 each include an array of spaced rigid features (e.g., rigid feature 118) that occupy substantially all of a z-direction thickness of the compliant spacers 104, 106. The array of rigid features limits compressive displacement of the compliant spacer by taking up much or all of the z-direction height of the anisotropic compliant spacers 104, 106. A compliant filler occupies a remainder of the anisotropic compliant spacers 104, 106 filling in around the spaced rigid features. The compliant filler permits shear displacement of the anisotropic compliant spacers 104, 106 and the array of rigid features is permitted to move in the x-y plane along with the displacement of the compliant filler.

XYZ coordinates are shown and described to illustrate directional features of the disclosed technology. Other coordinate systems may also be used with different orientations with similar effect. Further, various aspects of the haptic trackpad 102 (e.g., the anisotropic compliant spacers 104, 106, the spaced rigid features, and the haptic element 112) are depicted in broken lines in FIG. 1. These features would not normally be visible from an exterior of the keyboard 100 and/or may appear far different from the depictions in FIG. 1 but are nonetheless shown to illustrate the disclosed technology.

In various implementations, the keyboard 100 may itself be considered a computing device or be physically and/or communicatively coupled to a tablet computer, a laptop computer, a personal computer, a gaming device, a smart phone, or any other discrete device that carries out one or more specific sets of arithmetic and/or logical operations. Further, features of the haptic trackpad 102, including the anisotropic compliant spacers 104, 106, may be applied to any push button or other user-depressible interface component with a touch interface, with or without the keyboard 100. For example, the user-depressible interface component may be applied to vehicles (e.g., automobiles, watercraft, and aircraft), consumer electronics (e.g., cameras, telephones, and home appliances), and industrial or commercial machinery.

Figure 2:
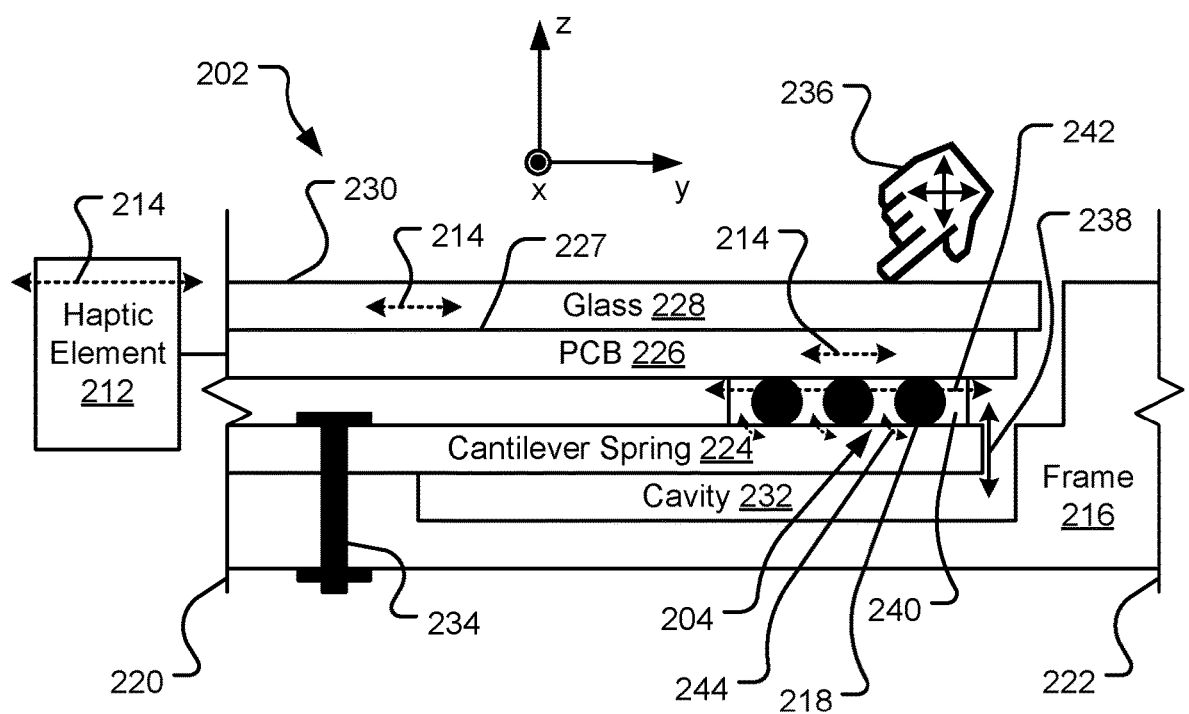
FIG. 2 illustrates a partial sectional elevation view of an example haptic trackpad with an anisotropic compliant spacer according to the presently disclosed technology.

FIG. 2 illustrates a partial sectional elevation view of an example haptic trackpad 202 with an anisotropic compliant spacer 204. The haptic trackpad 202 converts physical user inputs, illustrated as applied by user's hand 236, into corresponding electrical signals that may be interpreted by a computing device (not shown). The haptic trackpad 202 may utilize capacitive or resistive technology for sensing, as examples. The haptic trackpad 202 also provides haptic feedback to the user via the user's hand 236. The haptic trackpad 202 is illustrated in partial sectional view, as indicated by break lines 220, 222.

While a singular anisotropic compliant spacer 204 and cantilever spring 224 is depicted in FIG. 2 and described in detail below, as FIG. 2 is an illustration of a partial sectional elevation view, the haptic trackpad 202 may include additional anisotropic compliant spacers and/or cantilever springs that are not shown. The additional anisotropic compliant spacers and/or cantilever springs may be configured similarly to the anisotropic compliant spacer 204 and cantilever spring 224, as described in detail below. The total anisotropic compliant spacers and/or cantilever springs may be spread across an x-y planar area of the haptic trackpad 202 to distribute reaction force to the physical user inputs applied by user's hand 236. The multiple spaced anisotropic compliant spacers and/or cantilever springs (e.g., at least three matched pairs of anisotropic compliant spacers and cantilever springs) distribute load across the haptic trackpad 202 and help ensure the stiffness of the haptic trackpad 202 is sufficient so as to not deflect under expected loading conditions.

The haptic trackpad 202 is made up of a printed circuit board (PCB) 226 with a touch sensor thereon and a touch glass or simply glass 228 mounted on top of the PCB 226 (e.g., with a pressure-sensitive adhesive 227 adhering the glass 228 to the PCB 226). The touch sensor detects location, size, and motion of the user's touch inputs on a sensing surface 230 and the PCB 226 converts the location, size, and motion of the user's touch inputs into an electronic signal that can be interpreted by the computing device. The PCB 226 and associated touch sensor is mounted to a first end of the cantilever spring 224 via the anisotropic compliant spacer 204. A second end of the cantilever spring 224 is attached to a frame 216 of the haptic trackpad 202 (e.g., a midframe or device bucket) via bolt(s) or screw(s) (e.g., bolt 234). In other implementations, the cantilever spring 224 may be otherwise fixedly attached to the frame 216. The frame 216 serves as a structural framework for the haptic trackpad 202 and includes a cavity 232 that receives the cantilever spring 224 when the user depresses the sensing surface 230 and the cantilever spring 224 collapses into the cavity 232.

The cantilever spring 224 is resiliently deflectable and provides a predictable force-deflection profile for collapse into and rebound from the cavity 232, as illustrated by arrow 238, which aids in accurately measuring the physical depression magnitude of the haptic trackpad 202, and thus the applied force on the sensing surface 230. In various implementations, the cantilever spring 224 may be made of a metal alloy, including spring steel, a plastic, or a composite material. In other implementations, different types of springs may be used in place of the cantilever spring 224 (e.g., helical, arc, volute, leaf, etc.). The anisotropic compliant spacer 204 is designed with an absence of compliance (or very low compliance) in a z-direction with reference to the frame 216, so that it does not substantially influence an overall force-deflection profile of the haptic trackpad 202. An absence of compliance or very low compliance as used herein is less than 2% compression of the anisotropic compliant spacer 204 within an expected loading (e.g., 0-5 N) range of the haptic trackpad 202 (forces expected to be applied by the user's hand 236).

While the haptic trackpad 202 is capable of physical depression in order to detect the force magnitude applied thereon, the physical depression may be insufficient to provide the user an adequate trackpad feel and feedback. For example, the depression may be too small for the user to gauge application of adequate pressure to constitute a "click." To enhance the user's perception of adequate pressure to constitute a "click," the haptic trackpad 202 includes haptic element 212 that works in conjunction with the physical travel of the haptic trackpad 202 to give physical feedback to the user that adequate force to constitute a "click" has been applied to the haptic trackpad 202.

The haptic element 212 indicates the user-perceptible "click" by generating vibration or other repeated forces or motions (collectively, a haptic response), transmitting the haptic response to the PCB 226 and associated touch sensor, and to the user via the sensing surface 230 concurrently with or immediately before or after the physical depression of the haptic trackpad 202. As an example, linear oscillating vibration of the PCB 226 and associated touch sensor driven by the haptic element 212 is illustrated by dotted arrows 214, which are oriented along a y-axis of the haptic trackpad 202. In other implementations, the linear oscillating vibration is oriented along an x-axis or a combination of the x-axis and the y-axis of the haptic trackpad 202. A rotational oscillating vibration may be oriented within an x-y plane of the haptic trackpad 202.

The anisotropic compliant spacer 204 attaches the PCB 226 and the associated touch sensor to the cantilever spring 224, and ultimately to the frame 216. In some implementations, an adhesive on either side of the anisotropic compliant spacer 204 may aid in adhesion to the PCB 226 and/or the cantilever spring 224. In order for the haptic element 212 to vibrate the haptic trackpad 202 within the x-y plane but not substantially contribute to the overall z-direction force-deflection profile of the haptic trackpad 202, the anisotropic compliant spacer 204 is designed for compliance in the x-y plane and non-compliance in the z-direction with reference to the frame 216. This allows the PCB 226 and the associated touch sensor to be capable of movement caused by the haptic element 212 in the x-y plane, while allowing the physical depression of the haptic trackpad 202 into the cavity 232 to be controlled by the cantilever spring 224 (and other cantilever springs within the haptic trackpad 202) without substantial interference from the anisotropic compliant spacer 204 (and other anisotropic compliant spacers within the haptic trackpad 202).

The haptic trackpad 202 is designed with an absence of compliance (or very low compliance) in the z-direction with reference to the frame 216 within the anisotropic compliant spacer 204. This allows the z-direction displacement of sensing surface of the haptic trackpad 202 to be controlled primarily by the cantilever spring 224. In various implementations, the haptic trackpad 202 may be modeled such that small amounts of z-direction displacement caused by compression of various components of the haptic trackpad 202 outside of the cantilever spring 224 may be accounted for, but do not substantially affect the force-deflection profile of the haptic trackpad 202, which is controlled by the force-deflection profile of the cantilever spring 224. Further, the force-deflection profile of the cantilever spring 224 may be substantially linear to aid in accurate force measurement. For the haptic trackpad 202 to be controlled primarily or substantially by the cantilever spring 224 means that greater than 95% of the stroke of the haptic trackpad 202 within the expected loading range (e.g., 0-5 N) of the haptic trackpad 202 (forces expected to be applied by the user's hand 236) is caused by deflection of the cantilever spring 224.

The anisotropic compliant spacer 204 includes an array of spaced rigid features (e.g., rigid feature 218) that occupy substantially all of a z-direction thickness of the anisotropic compliant spacer 204. The array of rigid features limits compressive displacement of the anisotropic compliant spacer 204 by taking up much or all of the z-direction height of the anisotropic compliant spacer 204. In some implementations, a singular rigid feature is sufficient to set the z-direction height of the anisotropic compliant spacer 204. In various implementations, the anisotropic compliant spacer 204 is designed to adhere the PCB 226 to the cantilever spring 224, provide x-y place compliance in the haptic trackpad 202, and define a z-direction spacing between the PCB 226 to the cantilever spring 224 thickness when assembled.

In various implementations, the individual rigid features may be 25-600 microns in z-direction height (or diameter, in the case of cylindrical or spherical rigid features). In other implementations, the individual rigid features may be 300-600 microns in z-direction height (or diameter, in the case of cylindrical or spherical rigid features). Similarly, the z-direction height of the anisotropic compliant spacer 204 may be 25-600 microns or 300-600 microns. In various implementations, the individual rigid features may up substantially all the z-direction height of the anisotropic compliant spacer 204, which is defined herein as greater than 95% of the z-direction height of the anisotropic compliant spacer 204. In various implementations, the individual rigid features may be made of a metal alloy, including spring steel, plastic, glass, ceramic, or a composite material.

A compliant filler 240 occupies a remainder of the anisotropic compliant spacer 204 filling in around the spaced rigid features. The compliant filler 240 permits shear displacement of the anisotropic compliant spacer 204 and the rigid features may be permitted to move in the x-y plane along with the displacement of the compliant filler 240. More specifically, a top portion of the compliant spacer 204 moves with the PCB 226 and the associated touch sensor, as illustrated by dotted arrow 242, while a bottom portion of the compliant spacer 204 remains in a relative fixed position with the cantilever spring 224. The array of rigid features slightly roll in response to a shear force on the compliant filler 240, as indicated by corresponding curved dotted arrows (e.g., curved dotted arrow 244). In various implementations, the compliant filler 240 may be made of silicone, rubber, or other compliant materials that are formable around the array of rigid features and set in a resiliently deflectable or compressible solid state. This provides a technical benefit of compliance in the x-y plane for haptic operation of the haptic trackpad 202 and rigidity in the z-direction so to reduce or eliminate interference with the cantilever spring 224 of the haptic trackpad 202. For example, the compliant filler 240 may have a Shore durometer of 10-20 (Shore A).

XYZ coordinates are shown and described to illustrate directional features of the disclosed technology. Other coordinate systems may also be used with different orientations with similar effect. In various implementations, the haptic trackpad 202 may be physically and/or communicatively coupled to a variety of computing devices, such as a tablet computer, a laptop computer, a personal computer, a gaming device, a smart phone, or any other discrete device that carries out one or more specific sets of arithmetic and/or logical operations. Further, features of the haptic trackpad 202, including the anisotropic compliant spacer 204, may be applied to a haptic push button with a touch interface used for any practical application.

Figure 3:
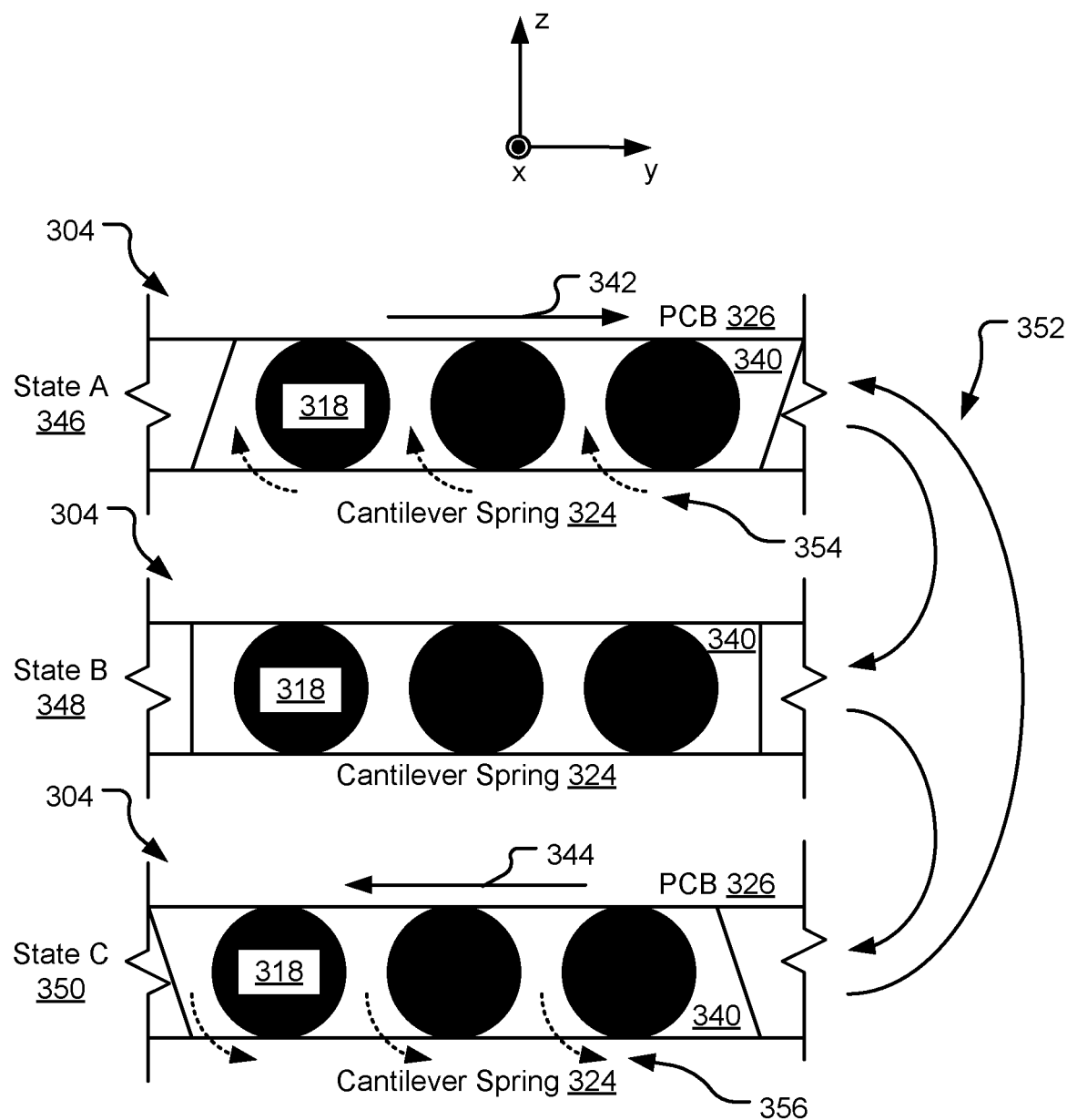
FIG. 3 illustrates a sectional elevation view of an example anisotropic compliant spacer in three distinct states according to the presently disclosed technology.

FIG. 3 illustrates a sectional elevation view of an example anisotropic compliant spacer 304 in three distinct states 346, 348, 350 according to the presently disclosed technology. XYZ coordinates are shown and described to illustrate directional features of the disclosed technology. Other coordinate systems may also be used with different orientations with similar effect. The anisotropic compliant spacer 304 is used as a component of a haptic trackpad, such as haptic trackpad 202 of FIG. 2. The anisotropic compliant spacer 304 may also be used in other haptic trackpad or haptic pushbutton designs.

The haptic trackpad is made up of a printed circuit board (PCB) 326 with a touch sensor thereon. The touch sensor detects location, size, and motion of the user's touch inputs and the PCB 326 converts the location, size, and motion of the user's touch inputs into an electronic signal that can be interpreted by a computing device (not shown). The PCB 326 and associated touch sensor is mounted to a cantilever spring 324 via the anisotropic compliant spacer 304. The PCB 326 and the cantilever spring 324 are illustrated in partial sectional view, as indicated by break lines. Remaining example structure and functionality of the PCB 326 and the cantilever spring 324 may be found referencing PCB 226 and the cantilever spring 224 of FIG. 2, discussed above.

While the haptic trackpad is capable of physical depression in order to detect the force magnitude applied thereon, the physical depression may be insufficient to provide the user an adequate trackpad feel and feedback. For example, the depression may be too small for the user to gauge application of adequate pressure to constitute a "click." To enhance the user's perception of adequate pressure to constitute a "click," the haptic trackpad includes a haptic element (not shown, see e.g., haptic element 212) that works in conjunction with the physical travel of the haptic trackpad to give physical feedback to the user that adequate force to constitute a "click" has been applied to the haptic trackpad.

The haptic element indicates the user-perceptible "click" by generating vibration or other repeated forces or motions (collectively, a haptic response), transmitting the haptic response to the PCB 326 and associated touch sensor, and to the user concurrently with or immediately before or after the physical depression of the haptic trackpad. Effects of the haptic response on the anisotropic compliant spacer 304 are illustrated in FIG. 3 as a rapid repetition of States A-C over time (e.g., State A, followed by State B, followed by State C, followed by State A, followed by State B, followed by State C, and so on), as illustrated by arrows 352.

The anisotropic compliant spacer 304 attaches the PCB 326 and the associated touch sensor to the cantilever spring 324, and ultimately to a frame (not shown, see e.g., frame 216 of the haptic trackpad 202 of FIG. 2). In order for the haptic element to vibrate the haptic trackpad within an x-y plane but not substantially contribute to the overall z-direction force-deflection profile of the haptic trackpad, the anisotropic compliant spacer 304 is designed for compliance in the x-y plane and non-compliance in the z-direction.

The anisotropic compliant spacer 304 includes an array of spaced rigid features (e.g., rigid feature 318) that occupy substantially all of a z-direction thickness of the anisotropic compliant spacer 304. The array of rigid features limits compressive displacement of the anisotropic compliant spacer 304 by taking up much or all of the z-direction height of the anisotropic compliant spacer 304. A compliant filler 340 occupies a remainder of the anisotropic compliant spacer 304 filling in around the spaced rigid features.

The compliant filler 340 permits shear displacement of the anisotropic compliant spacer 304 and the array of rigid features is permitted to move in the x-y plane along with the displacement of the compliant filler 340. More specifically, a top portion of the compliant spacer 304 moves with the PCB 326 and the associated touch sensor, as illustrated by arrow 342 of State A 346 and arrow 344 of State C 350, while a bottom portion of the compliant spacer 304 remains in a relative fixed position with reference to the cantilever spring 324. The rigid features (e.g., a quantity of rigid beads or ball bearings) slightly roll (e.g., less than 2 degrees of rotation) in response to the shear forces on the compliant filler 340, as indicated by corresponding curved dotted arrows 354 of State A 346 and curved dotted arrows 356 of State C 350. Using the rigid beads as a type of rigid feature offers a potential technical advantage of permitting the aforementioned rolling action, which facilitates compliance of the compliant spacer 304 in the x-y plane, while maintaining rigidity in the z-direction of the compliant spacer 304.

In another example implementations, the rigid features are a quantity of rigid cylinders oriented in a common axial direction (illustrated as along the x-axis in FIG. 3). The rigid cylinders are held in place between the PCB 326 and the cantilever spring 324 by the compliant filler 340. The rigid cylinders slightly roll (e.g., less than 2 degrees of rotation) in response to a shear force in the y-direction (e.g., a first shear direction), as indicated by corresponding curved arrows (e.g., curved arrows 354, 356). The anisotropic compliant spacer 304 resists movement in all other directions within the x-y plane (e.g., a second shear direction) due to the geometry of the cylindrical rigid features. Using the rigid cylinders as a type of rigid feature offers a potential technical advantage of aligning the aforementioned axial rolling action with an axial vibration of the haptic element. This facilitates compliance of the compliant spacer 304 in the x-y plane along the axis of vibration, while having less compliance in other directions in the x-y plane and maintaining rigidity in the z-direction of the compliant spacer 304. In still further implementations, one of the PCB 326 and the cantilever spring 324 may be punched, formed, or otherwise created with divots that function as seats for the rigid features. The divots aid in placement of the rigid features and enforcing a desired spacing between the rigid features.

Figure 4:
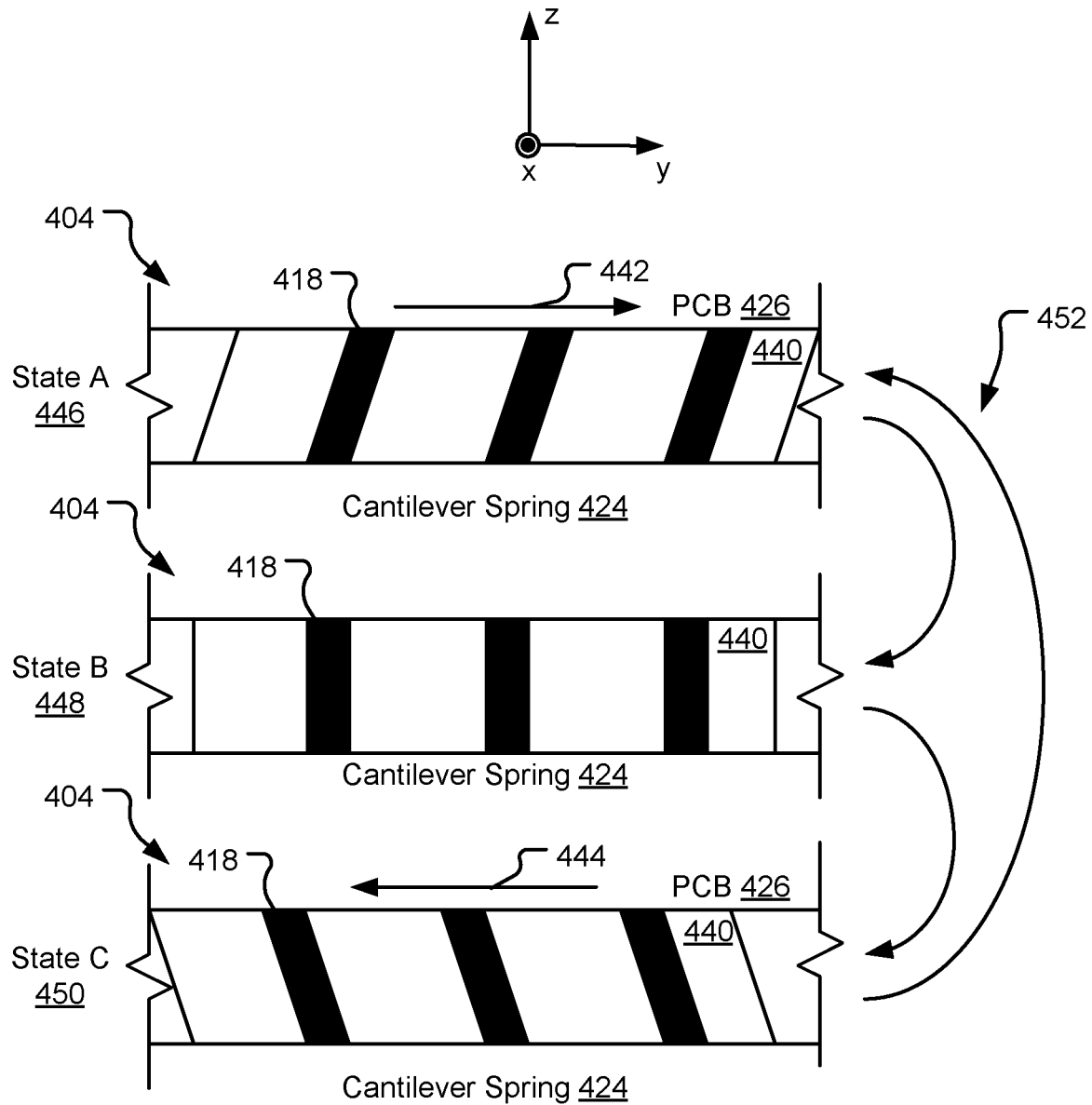
FIG. 4 illustrates a sectional elevation view of another example anisotropic compliant spacer in three distinct states according to the presently disclosed technology.

FIG. 4 illustrates a sectional elevation view of another example anisotropic compliant spacer 404 in three distinct states 446, 448, 450 according to the presently disclosed technology. XYZ coordinates are shown and described to illustrate directional features of the disclosed technology. Other coordinate systems may also be used with different orientations with similar effect. The anisotropic compliant spacer 404 is used as a component of a haptic trackpad, such as haptic trackpad 202 of FIG. 2. The anisotropic compliant spacer 404 may also be used in other haptic trackpad or haptic pushbutton designs.

The haptic trackpad is made up of a printed circuit board (PCB) 426 with a touch sensor thereon. The touch sensor detects location, size, and motion of the user's touch inputs and the PCB 426 converts the location, size, and motion of the user's touch inputs into an electronic signal that can be interpreted by a computing device (not shown). The PCB 426 and associated touch sensor is mounted to a cantilever spring 424 via the anisotropic compliant spacer 404. The PCB 426 and the cantilever spring 424 are illustrated in partial sectional view, as indicated by break lines. Remaining example structure and functionality of the PCB 426 and the cantilever spring 424 may be found referencing PCB 226 and the cantilever spring 224 of FIG. 2, discussed above.

While the haptic trackpad is capable of physical depression in order to detect the force magnitude applied thereon, the physical depression may be insufficient to provide the user an adequate trackpad feel and feedback. For example, the depression may be too small for the user to gauge application of adequate pressure to constitute a "click." To enhance the user's perception of adequate pressure to constitute a "click," the haptic trackpad includes a haptic element (not shown, see e.g., haptic element 212) that works in conjunction with the physical travel of the haptic trackpad to give physical feedback to the user that adequate force to constitute a "click" has been applied to the haptic trackpad.

The haptic element indicates the user-perceptible "click" by generating vibration or other repeated forces or motions (collectively, a haptic response), transmitting the haptic response to the PCB 426 and associated touch sensor, and to the user concurrently with or immediately before or after the physical depression of the haptic trackpad. Effects of the haptic response on the anisotropic compliant spacer 404 are illustrated in FIG. 4 as a rapid repetition of States A-C over time (e.g., State A, followed by State B, followed by State C, followed by State A, followed by State B, followed by State C, and so on), as illustrated by arrows 452.

The anisotropic compliant spacer 404 attaches the PCB 426 and the associated touch sensor to the cantilever spring 424, and ultimately to a frame (not shown, see e.g., frame 216 of the haptic trackpad 202 of FIG. 2). In order for the haptic element to vibrate the haptic trackpad within an x-y plane but not substantially contribute to the overall z-direction force-deflection profile of the haptic trackpad, the anisotropic compliant spacer 404 is designed for compliance in the x-y plane and non-compliance in the z-direction.

The anisotropic compliant spacer 404 includes an array of spaced high-aspect ratio (greater than 1) rigid features (e.g., rigid feature 418) that occupy substantially all of a z-direction thickness of the anisotropic compliant spacer 404. The high-aspect ratio rigid features limit compressive displacement of the anisotropic compliant spacer 404 by taking up much or all of the z-direction height of the anisotropic compliant spacer 404. A compliant filler 440 occupies a remainder of the anisotropic compliant spacer 404 filling in around the spaced rigid features.

The compliant filler 440 permits shear displacement of the anisotropic compliant spacer 404 and the high-aspect ratio rigid features are permitted to deflect in the x-y plane along with the displacement of the compliant filler 440. More specifically, a top portion of the compliant spacer 404, including top portions of the rigid features, moves with the PCB 426 and the associated touch sensor, as illustrated by arrow 442 of State A 446 and arrow 444 of State C 450, while a bottom portion of the compliant spacer 404, including bottom portions of the rigid features, remains in a relative fixed position with reference to the cantilever spring 424.

In one example implementation, the rigid features are columns or other protrusions from the cantilever spring 424, which are contiguous with the cantilever spring 424 and extend through the compliant spacer 404 to meet the PCB 426 but are not necessarily attached to the PCB 426. Top portions of the column-shaped rigid features flex with the shear displacement of the anisotropic compliant spacer 404, as shown.

In another example implementation, the rigid features are columns or other protrusions from the PCB 426 (e.g., solder or metal structures soldered to the PCB 426), which are contiguous with the PCB 426 and extend through the compliant spacer 404 to meet the cantilever spring 424 but are not necessarily attached to the cantilever spring 424. Bottom portions of the column-shaped rigid features flex with the shear displacement of the anisotropic compliant spacer 404. In yet other implementations, the rigid features are columns connected to both the PCB 426 and the cantilever spring 424 at respective distal ends of the column-shaped rigid features.

While the rigid features are depicted as columns in FIG. 4, in other implementations, the rigid features may have any convenient shape and relative dimension (e.g., hemispherical bumps, conical columns, thin pins, thick cylinders, etc.). Further, in some implementations, the array of rigid features may be designed to remain in an upright position (or not substantially deflected) in all of States A-C and the shear displacement of the anisotropic compliant spacer 404 is obtained by compressing and shifting the compliant filler 440 between the array of rigid features, as illustrated in FIG. 5 and described in detail below.

Figure 5:
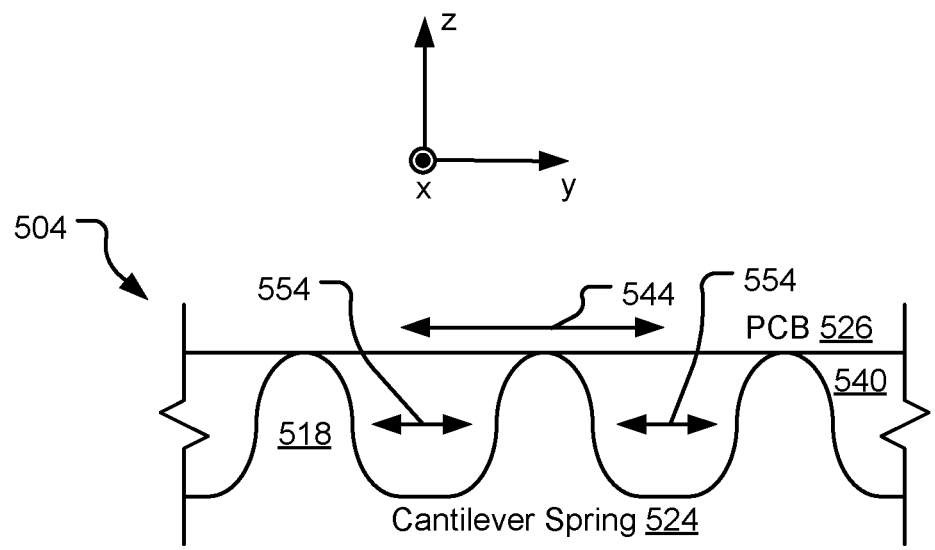
FIG. 5 illustrates a sectional elevation view of yet another example anisotropic compliant spacer according to the presently disclosed technology.

FIG. 5 illustrates a sectional elevation view of yet another example anisotropic compliant spacer 504 according to the presently disclosed technology. XYZ coordinates are shown and described to illustrate directional features of the disclosed technology. Other coordinate systems may also be used with different orientations with similar effect. The anisotropic compliant spacer 504 is used as a component of a haptic trackpad, such as haptic trackpad 202 of FIG. 2. The anisotropic compliant spacer 504 may also be used in other haptic trackpad or haptic pushbutton designs.

The haptic trackpad is made up of a printed circuit board (PCB) 526 with a touch sensor thereon. The touch sensor detects location, size, and motion of the user's touch inputs and the PCB 526 converts the location, size, and motion of the user's touch inputs into an electronic signal that can be interpreted by a computing device (not shown). The PCB 526 and associated touch sensor is mounted to a cantilever spring 524 via the anisotropic compliant spacer 504. The PCB 526 and the cantilever spring 524 are illustrated in partial sectional view, as indicated by break lines. Remaining example structure and functionality of the PCB 526 and the cantilever spring 524 may be found referencing PCB 226 and the cantilever spring 224 of FIG. 2, discussed above.

While the haptic trackpad is capable of physical depression in order to detect the force magnitude applied thereon, the physical depression may be insufficient to provide the user an adequate trackpad feel and feedback. For example, the depression may be too small for the user to gauge application of adequate pressure to constitute a "click." To enhance the user's perception of adequate pressure to constitute a "click," the haptic trackpad includes a haptic element (not shown, see e.g., haptic element 212) that works in conjunction with the physical travel of the haptic trackpad to give physical feedback to the user that adequate force to constitute a "click" has been applied to the haptic trackpad.

The haptic element indicates the user-perceptible "click" by generating vibration or other repeated forces or motions (collectively, a haptic response), transmitting the haptic response to the PCB 526 and associated touch sensor, and to the user concurrently with or immediately before or after the physical depression of the haptic trackpad. Effects of the haptic response on the anisotropic compliant spacer 504 are illustrated in FIG. 5 as a rapid oscillation in the y-direction, as illustrated by arrow 544.

The anisotropic compliant spacer 504 attaches the PCB 526 and the associated touch sensor to the cantilever spring 524, and ultimately to a frame (not shown, see e.g., frame 216 of the haptic trackpad 202 of FIG. 2). In order for the haptic element to vibrate the haptic trackpad within an x-y plane but not substantially contribute to the overall z-direction force-deflection profile of the haptic trackpad, the anisotropic compliant spacer 504 is designed for compliance in the x-y plane and non-compliance in the z-direction.

The anisotropic compliant spacer 504 includes an array of low-aspect ratio (less than 1) spaced rigid features (e.g., rigid feature 518) that occupy substantially all of a z-direction thickness of the anisotropic compliant spacer 504. The low-aspect ratio rigid features limit compressive displacement of the anisotropic compliant spacer 504 by taking up much or all of the z-direction height of the anisotropic compliant spacer 504. A compliant filler 540 occupies a remainder of the anisotropic compliant spacer 504 filling in around the spaced rigid features.

The compliant filler 540 permits shear displacement of the anisotropic compliant spacer 504 in and around the array of low-aspect ratio rigid features, as illustrated by arrows 554. The low-aspect ratio rigid features are depicted as remaining substantially stationary as the compliant filler 540 within the anisotropic compliant spacer 504 deflects in the y-direction. The low-aspect ratio rigid features are depicted as protrusions from the cantilever spring 524 (e.g., bumps or nubs) extending substantially a z-direction height of the anisotropic compliant spacer 504. In such implementations, the low-aspect ratio rigid features are contiguous with the cantilever spring 524 and extend through the compliant spacer 504 to meet the PCB 526 but are not necessarily attached to the PCB 526.

In other implementations, top portions of the low-aspect ratio rigid features flex with the shear displacement of the anisotropic compliant spacer 504, as shown in FIG. 4 and described above. In still further example implementations, the rigid features are contiguous protrusions from the PCB 526. The rigid features extend through the compliant spacer 504 to meet the cantilever spring 524 but are not necessarily attached to the cantilever spring 524. While the rigid features are depicted as bumps or nubs in FIG. 5, in other implementations, the rigid features may have any convenient shape and relative dimension (e.g., hemispherical bumps, conical columns, thin pins, thick cylinders, etc.).

Figure 6:
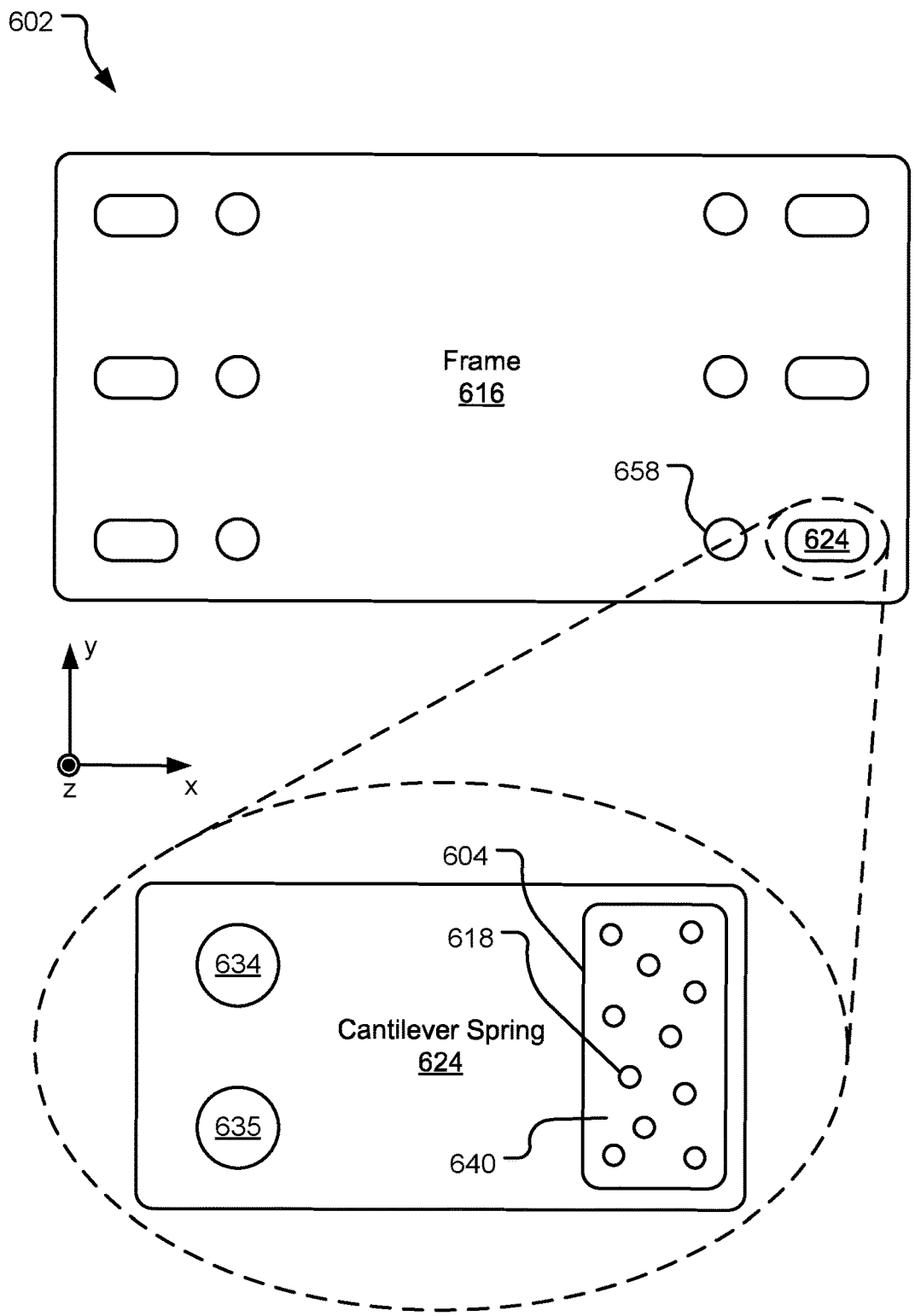
FIG. 6 illustrates a plan view of an example haptic trackpad with an arrangement of anisotropic compliant spacers according to the presently disclosed technology.

FIG. 6 illustrates a plan view of an example haptic trackpad 602 with an arrangement of anisotropic compliant spacers (e.g., anisotropic compliant spacer 604) according to the presently disclosed technology. The haptic trackpad 602 converts physical user inputs, into corresponding electrical signals that may be interpreted by a computing device (not shown). The haptic trackpad 602 also provides haptic feedback to the user. The haptic trackpad 202 is illustrated in partial plan view, with a PCB and associated touch sensor removed (or not visible) that would otherwise cover the illustrated portion of frame 616. XYZ coordinates are shown and described to illustrate directional features of the disclosed technology. Other coordinate systems may also be used with different orientations with similar effect.

A total of 6 cantilever springs (e.g., cantilever spring 624) and 6 deflection sensors (e.g., deflection sensor 658) are illustrated spread across the frame 616 where the PCB and associated touch sensor is to be mounted. This provides a distribution of load applied to the PCB and associated touch sensor in response to a user's applied force. Further, outputs from the multiple deflection sensors may be averaged or otherwise combined to output a more accurate measurement of displacement of the PCB and associated touch sensor, and by proxy, the force applied by the user. Still further, due to the redundancy of multiple deflection sensors, measurement outlier(s) may be filtered out. For example, if one or more of the deflection sensors are damaged and outputting an erroneous signal or no signal at all, the haptic trackpad 602 could still be operational with the remaining deflection sensors.

While 6 cantilever springs and 6 deflection sensors are illustrated and described, in other implementations, any number of cantilever springs and deflection sensors may be used, and the number of cantilever springs may not be equal to the number of deflection sensors. The total anisotropic compliant spacers and/or cantilever springs may be spread across an x-y planar area of the haptic trackpad 602 to distribute reaction force to the physical user inputs. The multiple spaced anisotropic compliant spacers and/or cantilever springs (e.g., the depicted 6 anisotropic compliant spacers and 6 cantilever springs) distribute load across the haptic trackpad 602 and help ensure the stiffness of the haptic trackpad 602 is sufficient so as to not deflect under expected loading conditions. While only anisotropic compliant spacer 604 and cantilever spring 624 are depicted in detail in FIG. 6 and described in below, the other depicted cantilever springs and associated anisotropic compliant spacers may be configured similarly.

The PCB and associated touch sensor are mounted to a first end of the cantilever spring 624 via the anisotropic compliant spacer 604. A second end of the cantilever spring 624 is attached to the frame 616 of the haptic trackpad 602 (e.g., a midframe or device bucket) via bolts or screws 634, 635. In other implementations, the cantilever spring 624 may be otherwise fixedly attached to the frame 616. The frame 616 serves as a structural framework for the haptic trackpad 602 and includes a cavity that receives the cantilever spring 624 when the user depresses the PCB and associated touch sensor and the cantilever spring 624 collapses into the cavity.

The cantilever spring 624 is resiliently deflectable and provides a predictable force-deflection profile for collapse into and rebound from the cavity, which aids in accurately measuring the physical depression magnitude of the haptic trackpad 602, and thus the applied force on the PCB and associated touch sensor. The anisotropic compliant spacer 604 is designed with an absence of compliance (or very low compliance) in a z-direction with reference to the frame 616, so that it does not substantially influence an overall force-deflection profile of the haptic trackpad 602. The deflection sensor 658 detects the physical depression magnitude of the haptic trackpad 602, and thus the applied force on the PCB and associated touch sensor. In one example implementation, the deflection sensor 658 is a parallel plate capacitor that measures applied force using an electrostatic sensor. Further, the deflection sensor 658 may incorporate one or more of capacitive, inductive, magnetic, optical, ultrasonic, and hall effect technology.

While the haptic trackpad 602 is capable of physical depression in order to detect the force magnitude applied thereon, the physical depression may be insufficient to provide the user an adequate trackpad feel and feedback. For example, the depression may be too small for the user to gauge application of adequate pressure to constitute a "click." To enhance the user's perception of adequate pressure to constitute a "click," the haptic trackpad 602 includes a haptic element (not shown, see e.g., haptic element 212 of FIG. 2) that works in conjunction with the physical travel of the haptic trackpad 602 to give physical feedback to the user that adequate force to constitute a "click" has been applied to the haptic trackpad 602.

The haptic element indicates the user-perceptible "click" by generating vibration or other repeated forces or motions (collectively, a haptic response), transmitting the haptic response to the PCB and associated touch sensor, and to the user concurrently with or immediately before or after the physical depression of the haptic trackpad 602. The haptic response is oriented within an x-y plane of the haptic trackpad 602, and in some implementations, may be linear (i.e., oriented along the y-axis, the y-axis, or another axis within the x-y plane of the haptic trackpad 602).

The anisotropic compliant spacer 604 attaches the PCB and the associated touch sensor to the cantilever spring 624, and ultimately to the frame 616. In order for the haptic element to vibrate the haptic trackpad 602 within the x-y plane but not substantially contribute to the overall z-direction force-deflection profile of the haptic trackpad 602, the anisotropic compliant spacer 604 is designed for compliance in the x-y plane and non-compliance in the z-direction with reference to the frame 616. This allows the PCB and the associated touch sensor to be capable of movement caused by the haptic element in the x-y plane, while allowing the physical depression of the haptic trackpad 602 into the cavity to be controlled by the cantilever spring 624 (and the other cantilever springs within the haptic trackpad 602) without substantial interference from the anisotropic compliant spacer 604 (and other the anisotropic compliant spacers within the haptic trackpad 602).

The haptic trackpad 602 is designed with an absence of compliance (or very low compliance) in the z-direction with reference to the frame 616 within the anisotropic compliant spacer 604. This allows the z-direction displacement of sensing surface of the haptic trackpad 602 to be controlled primarily by the cantilever spring 624. The anisotropic compliant spacer 604 includes an array of spaced rigid features (e.g., rigid feature 618) that occupy substantially all of a z-direction thickness of the anisotropic compliant spacer 604. The array of rigid features limits compressive displacement of the anisotropic compliant spacer 604 by taking up much or all of the z-direction height of the anisotropic compliant spacer 604. In other implementations, a singular rigid feature is sufficient to set the z-direction height of the anisotropic compliant spacer 604.

The individual rigid features may be spaced in a semi-random but generally equidistant fashion, as depicted. In other implementations, the individual rigid features may be orderly and equally spaced. In still other implementations, the individual rigid features may be arranged in a fashion to favor compliance along one or more axes with the x-y plane, or disfavor compliance along one or more axes with the x-y plane. For example, lining up the individual rigid features may disfavor compliance along an axis in alignment individual rigid features. A compliant filler 640 occupies a remainder of the anisotropic compliant spacer 604 filling in around the spaced rigid features. The compliant filler 640 permits shear displacement of the anisotropic compliant spacer 604 and the rigid features may be permitted to move in the x-y plane along with the displacement of the compliant filler 640.

Figure 7:
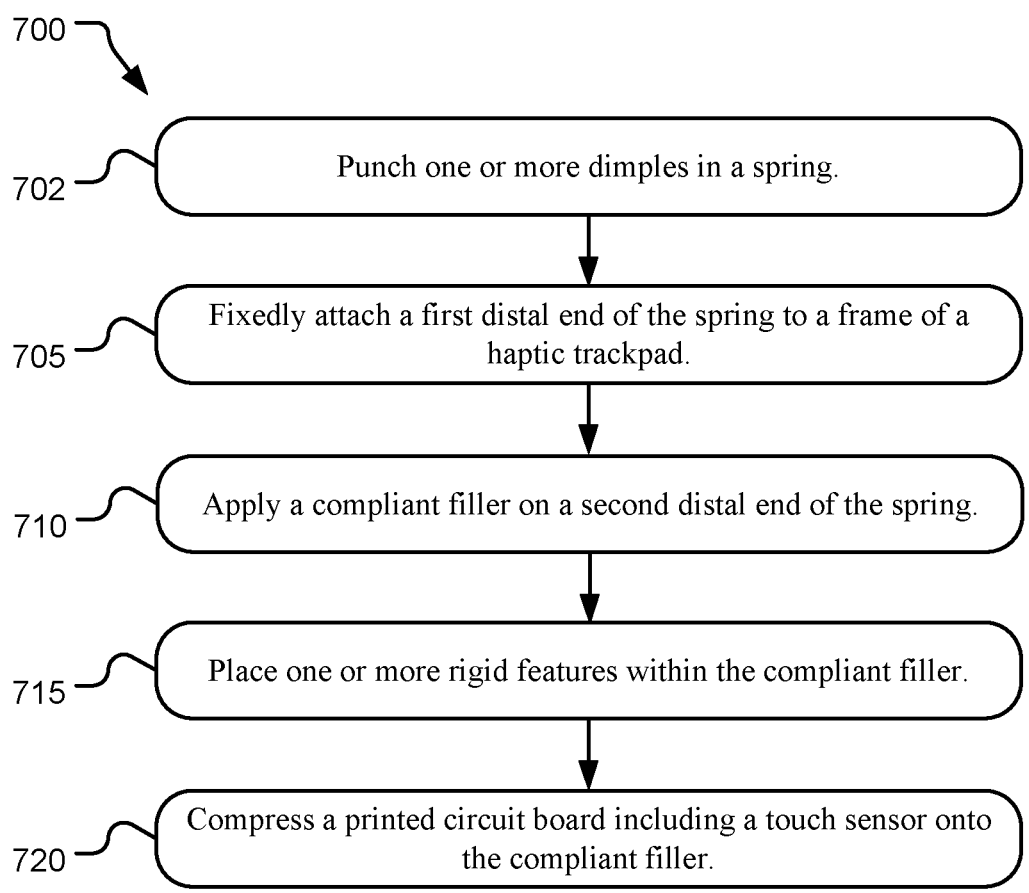
FIG. 7 illustrates example operations for manufacturing a haptic trackpad with an anisotropic compliant spacer.

FIG. 7 illustrates example operations 700 for manufacturing a haptic trackpad with an anisotropic compliant spacer. A punching operation 702 punches one or more dimples in a spring for a haptic trackpad. In some implementations, the dimples may be punched to a depth to define a height of the anisotropic compliant spacer and serve as rigid features. In other implementations, the dimples may be punched or scored to a depth sufficient to serve as seats for one or more corresponding rigid features (see operation 715 below) or the punching may result in apertures in the spring. The dimples or apertures then serve as spacing and alignment aids for the rigid features. Further, the punching operation 702 may be omitted, particularly when the rigid features referenced below are used in lieu of the dimples.

A fixedly attaching operation 705 fixedly attaches a first distal end of a spring to a frame of the haptic trackpad. In various implementations, the spring is screwed, bolted or adhered to the frame. In other implementations, the spring may be contiguous with the frame. An applying operation 710 applies a compliant filler on a second distal end of the spring. The compliant filler may be a silicone and/or rubber material that is applied in a semi-liquid or gel state on the spring and then cured after compressing operation 720, discussed below. In other implementations, the applying operation 710 involves use a mold (e.g., an injection mold) to cure the compliant filler in a desired size and shape prior to the compressing operation 720.

A placing operation 715 places one or more rigid features within the compliant filler. In some implementations, the rigid feature may be one or more small beads or cylinders that have a diameter that defines a thickness of the compliant filler when the haptic trackpad is fully assembled. The placing operation 715 may utilize the dimples referenced above in operation 702 to achieve a desired spacing and alignment for the rigid features. Further, the placing operation 715 may be omitted, particularly when the dimples are used in lieu of placed rigid features. Still further, the placing operation 715 may involve molding, thin film applying, or 3D printing the one or more rigid features onto the spring and/or the PCB.

A compressing operation 720 compresses a PCB including a touch sensor onto the compliant filler. The compressing operation 720 may utilize adhesion of the compliant filler in an uncured state and/or adhesives to adequately adhere the anisotropic compliant spacer to the PCB and the spring. The compliant filler and the rigid feature(s) in combination are referred to herein as the anisotropic compliant spacer. The rigid feature(s) generally limit compressive displacement of the anisotropic compliant spacer and the compliant filler generally permits shear displacement of the anisotropic compliant spacer.

In an example implementation, the applying operation 710 is accomplished using a mold and a silkscreen is used in placing operation 715 to place multiple rigid features simultaneously. In another example implementation, the applying operation 710 is also accomplished using a mold, but one or more apertures are left in the mold after curing the compliant filler. The placing operation 715 then places the one or more rigid features within the apertures in the compliant filler, in some cases with glue to hold the rigid features in place.

In yet another implementation, the placing operation 715 occurs before the applying operation 710. As a result, the one or more rigid features are mixed within the compliant filler and the combined matrix of compliant filler/rigid features is applied to the spring using an applicator. Further, the combined matrix of compliant filler/rigid features may be used to make anisotropic compliant spacers independently from the haptic trackpad. More specifically, the combined matrix of compliant filler/rigid features may be cured as a large workpiece, than is then cut up into applicable sizes and shapes (e.g., a sheet of material die cut, or an extruded rod sliced) to form the anisotropic compliant spacers.

The operations making up the embodiments of the invention described herein are referred to variously as operations, steps, objects, or modules. Furthermore, the operations may be performed in any order, adding or omitting operations as desired, unless explicitly claimed otherwise or a specific order is inherently necessitated by the claim language. Unless otherwise explicitly defined, dimensions described as substantially or approximately herein are +/−10% of the values provided.

Implementations shown and described herein provide a trackpad comprising a frame, a printed circuit board (PCB) including a touch sensor, and an anisotropic compliant spacer oriented between the frame and the PCB. The anisotropic compliant spacer includes a rigid feature that occupies substantially all of a thickness of the anisotropic compliant spacer, the rigid feature to limit compressive displacement of the anisotropic compliant spacer. The anisotropic compliant spacer also includes a compliant filler that occupies a remainder of the anisotropic compliant spacer, the compliant filler to permit shear displacement of the anisotropic compliant spacer.

Implementations shown and described herein further provide that the trackpad further comprises a spring connecting the anisotropic compliant spacer to the frame, the spring to permit compressive displacement of the touch sensor with reference to the frame.

Implementations shown and described herein further provide that the spring cantilevers the PCB over a cavity in the frame.

Implementations shown and described herein further provide that the rigid feature includes a protrusion from one or both of the PCB and the spring.

Implementations shown and described herein further provide that the trackpad further comprises an array of spaced rigid features that occupy substantially all of the thickness of the anisotropic compliant spacer, the array of spaced rigid features to limit compressive displacement of the anisotropic compliant spacer.

Implementations shown and described herein further provide that the array of spaced rigid features includes a quantity of rigid beads, each seated in a protrusion from one of the PCB and the spring and held in place by the compliant filler.

Implementations shown and described herein further provide that the array of spaced rigid features includes a quantity of rigid beads held in place by the compliant filler.

Implementations shown and described herein further provide that the array of spaced rigid features includes a quantity of rigid cylinders oriented in a common axial direction and held in place by the compliant filler.

Implementations shown and described herein further provide that the anisotropic compliant spacer permits more displacement in a first shear direction than a second shear direction orthogonal to the first shear direction.

Implementations shown and described herein further provide that the compliant filler is of a resiliently compressible material.

Implementations shown and described herein further provide that the rigid feature defines a thickness of the anisotropic compliant spacer.

Implementations shown and described herein further provide that the trackpad further comprises a haptic element connected to the PCB, the haptic element to selectively vibrate the PCB with reference to the frame.

Implementations shown and described herein further provide that the haptic element is actuated by compression of the PCB with reference to the frame caused by a user depressing the touch sensor.

Implementations shown and described herein further provide that the haptic element includes one or more of an unbalanced motor, a piezoelectric device, an electrostatic device, and an ultrasonic device.

Implementations shown and described herein further provide a method for manufacturing a trackpad with an anisotropic compliant spacer. The method comprises fixedly attaching a first distal end of a spring to a frame of the trackpad, applying a compliant filler on a second distal end of the spring, placing a rigid feature within the compliant filler, and compressing a printed circuit board including a touch sensor onto the compliant filler. The rigid feature defines a thickness of the compliant filler. The rigid feature further limits compressive displacement of the anisotropic compliant spacer. The compliant filler permits shear displacement of the anisotropic compliant spacer.

Implementations shown and described herein further provide that the compliant filler and the rigid feature in combination are the anisotropic compliant spacer.

Implementations shown and described herein further provide that the method further comprises punching the spring with a dimple, the dimple to serve as a seat for the rigid feature.

Implementations shown and described herein further provide a haptic button comprising a frame, a touch interface, an anisotropic compliant spacer oriented between the frame and the touch interface, and a spring connecting the anisotropic compliant spacer to the frame, the spring to permit compressive displacement of the touch interface with reference to the frame. The anisotropic compliant spacer includes a spaced rigid feature that occupies substantially all of a thickness of the anisotropic compliant spacer, the rigid feature to limit compressive displacement of the anisotropic compliant spacer. The anisotropic compliant spacer further includes a compliant filler that occupies a remainder of the anisotropic compliant spacer, the compliant filler to permit shear displacement of the anisotropic compliant spacer.

Implementations shown and described herein further provide that the haptic button further comprises an array of spaced rigid features that occupy substantially all of the thickness of the anisotropic compliant spacer, the array of spaced rigid features to limit compressive displacement of the anisotropic compliant spacer.

Implementations shown and described herein further provide that the haptic button further comprises a haptic element connected to the touch interface, the haptic element to selectively vibrate the touch interface with reference to the frame.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A trackpad comprising:
   a frame;
   a printed circuit board (PCB) including a touch sensor;
   an anisotropic compliant spacer oriented between the frame and the PCB, the anisotropic compliant spacer including:
   a rigid feature that occupies substantially all of a thickness of the anisotropic compliant spacer, the rigid feature to limit compressive displacement of the anisotropic compliant spacer;
   a compliant filler that occupies a remainder of the anisotropic compliant spacer, the compliant filler to permit shear displacement of the anisotropic compliant spacer.

2. The trackpad of claim 1, further comprising:
   a spring connecting the anisotropic compliant spacer to the frame, the spring to permit compressive displacement of the touch sensor with reference to the frame.

3. The trackpad of claim 2, wherein the spring cantilevers the PCB over a cavity in the frame.

4. The trackpad of claim 2, wherein the rigid feature includes a protrusion from one or both of the PCB and the spring.

5. The trackpad of claim 2, further comprising:
   an array of spaced rigid features that occupy substantially all of the thickness of the anisotropic compliant spacer, the array of spaced rigid features to limit compressive displacement of the anisotropic compliant spacer.

6. The trackpad of claim 5, wherein the array of spaced rigid features includes a quantity of rigid beads, each seated in a protrusion from one of the PCB and the spring and held in place by the compliant filler.

7. The trackpad of claim 5, wherein the array of spaced rigid features includes a quantity of rigid beads held in place by the compliant filler.

8. The trackpad of claim 5, wherein the array of spaced rigid features includes a quantity of rigid cylinders oriented in a common axial direction and held in place by the compliant filler.

9. The trackpad of claim 1, wherein the anisotropic compliant spacer permits more displacement in a first shear direction than a second shear direction orthogonal to the first shear direction.

10. The trackpad of claim 1, wherein the compliant filler is of a resiliently compressible material.

11. The trackpad of claim 1, wherein the rigid feature defines a thickness of the anisotropic compliant spacer.

12. The trackpad of claim 1, further comprising:
    a haptic element connected to the PCB, the haptic element to selectively vibrate the PCB with reference to the frame.

13. The trackpad of claim 12, wherein the haptic element is actuated by compression of the PCB with reference to the frame caused by a user depressing the touch sensor.

14. The trackpad of claim 12, wherein the haptic element includes one or more of an unbalanced motor, a piezoelectric device, an electrostatic device, and an ultrasonic device.

15. A method for manufacturing a trackpad with an anisotropic compliant spacer, the method comprising:
    fixedly attaching a first distal end of a spring to a frame of the trackpad;
    applying a compliant filler on a second distal end of the spring;
    placing a rigid feature within the compliant filler; and
    compressing a printed circuit board including a touch sensor onto the compliant filler, wherein the rigid feature defines a thickness of the compliant filler, wherein the rigid feature limits compressive displacement of the anisotropic compliant spacer and the compliant filler permits shear displacement of the anisotropic compliant spacer.

16. The method of claim 15, wherein the compliant filler and the rigid feature in combination are the anisotropic compliant spacer.

17. The method of claim 15, further comprising:
punching the spring with a dimple, the dimple to serve as a seat for the rigid feature.

18. A haptic button comprising:
a frame;
a touch interface;
an anisotropic compliant spacer oriented between the frame and the touch interface, the anisotropic compliant spacer including:
a spaced rigid feature that occupies substantially all of a thickness of the anisotropic compliant spacer, the rigid feature to limit compressive displacement of the anisotropic compliant spacer;
a compliant filler that occupies a remainder of the anisotropic compliant spacer, the compliant filler to permit shear displacement of the anisotropic compliant spacer; and
a spring connecting the anisotropic compliant spacer to the frame, the spring to permit compressive displacement of the touch interface with reference to the frame.

19. The haptic button of claim 18, further comprising:
an array of spaced rigid features that occupy substantially all of the thickness of the anisotropic compliant spacer, the array of spaced rigid features to limit compressive displacement of the anisotropic compliant spacer.

20. The haptic button of claim 18, further comprising:
a haptic element connected to the touch interface, the haptic element to selectively vibrate the touch interface with reference to the frame.

* * * * *